ns Patent [19]

Erb

[11] 3,856,900
[45] Dec. 24, 1974

[54] PRODUCTION OF SPHERICAL POLYVINYL CHLORIDE PARTICLES
[75] Inventor: Edward R. Erb, Milford Township, Bucks City, Pa.
[73] Assignee: GAF Corporation, New York, N.Y.
[22] Filed: Dec. 27, 1972
[21] Appl. No.: 319,035

[52] U.S. Cl. .............................. 264/9, 264/DIG. 60
[51] Int. Cl. .......................... B29b 1/00, B29c 23/00
[58] Field of Search ............ 264/9, 5, DIG. 60, 117; 425/6, 10

[56] References Cited
UNITED STATES PATENTS
| 2,964,521 | 12/1960 | Coffee | 264/9 |
| 2,974,135 | 3/1961 | Andrew | 264/9 |
| 3,345,235 | 10/1967 | Miller | 264/6 |
| 3,586,654 | 6/1971 | Lerman et al. | 264/9 |

Primary Examiner—Robert F. White
Assistant Examiner—James B. Lowe
Attorney, Agent, or Firm—Walter C. Kehm; Samson B. Leavitt

[57] ABSTRACT

Plasticized polyvinyl chloride particles are prepared by dispersing a plasticol in an agitated liquid medium immiscible therewith maintained at about 100°–140°F. The liquid medium is agitated so that the plastisol is dispersed as small droplets of essentially spherical form having a particle size not exceeding about 0.03 inch. The liquid medium is then heated to a temperature above about 150°F, e.g., up to about 350°F but advantageously to a temperature up to the boiling point of the liquid medium, to achieve gelation of the plastisol droplets, which are then separated from the liquid medium. The resulting plasticized particles are of essentially spherical form and have an advantageously narrow particle size distribution range. The particles are essentially dust free and have highly desirable free flowing characteristics. Blends of two or more plastisol compositions, e.g., of different color, can readily be obtained.

28 Claims, No Drawings

PRODUCTION OF SPHERICAL POLYVINYL CHLORIDE PARTICLES

BACKGROUND OF THE INVENTION

1. Field of the Invention

This invention relates to plasticized polyvinyl chloride particles. More particularly, it relates to the production of said particles having highly advantageous size, shape and handling characteristics.

2. Description of the Prior Art

The production of gelled particles from polyvinyl chloride plastisols is known in the art as indicated by the Miller patent U.S. Pat No. 3,345,235. According to the Miller technique, a fine stream of liquid plastisol material is dropped into a tank of hot, immiscible liquid, such as water, having a lower specific gravity than that of the plastisol being processed. The water or other liquid medium is thus maintained at a temperature of from about 150° F up to the boiling point of the liquid medium, particularly at a temperature of from about 180° F to said boiling point. The droplets of plastisol material, provided by the stream of plastisol dropped into tank 6 from an elevated receptacle 4, will solidify or gel as the droplets descend in the water prior to contact with the bottom of tank 6 or with other particles. An accumulation of thus gelled particles is thereby obtained in strainer basket 7 at the bottom of said tank 6 (See Column 2, lines 39-72). While the Miller process and apparatus are advantageous for certain applications, it should be noted that the Miller technique is limited essentially to plastisols having a specific gravity hevier than the heated liquid into which the plastisol stream is dropped, since it is desirable in that process that the plastisol droplets fall through the liquid with a path sufficiently long for the droplets to become heated and gelled prior to contact with each other in the bottom of tank 6. As a result, the production of foamable beads, that is, beads that contain a chemical blowing agent, is rendered somewhat burdensome since even a slight decomposition of the chemical blowing agent produces or discharges enough gas to cause, or to tend to cause, the beads to float in the liquid medium and thus to coalesce.

As the droplet formation of Miller depends upon the break-up of the falling plastisol stream into droplets in the liquid medium, the resulting beads produced tend to be of relatively large size. In Column 4, lines 15-19, Miller discloses, in typical cases, the most of the beads or particles formed will range in size from a diameter of about 1/64 inch to about ⅛ inch. In practice, a substantial portion of the beads produced will have a relatively large size on the order of about 1/16 inch to about ⅛ inch. This, in turn, imposes restrictions on the rheology and other physical characteristics of the liquid plastisol employed. In addition, the production of plastisol particles of a smaller particle size would be advantageous both from handling viewpoint and in many applications of such particles. In addition to such commercially significant application and handling limitations, the Miller technique is also subject to some operating circumstances that require specific accommodations in practical applications thereof. Thus, it is necessary to place the stream-producing orifices of Miller above the hot liquid tank 6 where vapors from said tank 6 tend to heat the orifice and can thereby cause plastisol solidification and orifice plugging problems, as well as condensation of bath vapors therein.

The production of plastisol beads by the Miller technique is most readily applied to the production of beads of a single color. While mixtures of differently colored beads could be produced by the simultaneous feeding of differently colored plastisols into the stream or streams dropped from receptacle 4, the necessary geometry of the stream-producing nozzles would thereby be rendered more complex, increasingly so with the number of desired colors, and the maintenance of exact plastisol ratios and uniformity of mixture would likewise present practical operating problems. As a result, desired uniformity of the blended product would be difficult to achieve without the incurring of a considerable increase in potential equipment costs and related processing difficulties and expense. With regard to such processing features, it should also be noted that the Miller process is limited essentially to the use of liquid medium temperatures up to approximately 212° F, the boiling point of water. While somewhat higher liquid temperatures would be possible in the event nonaqueous liquids or salt solutions are employed, such higher temperature operations would be difficult to achieve in practice because of density, viscosity, nonsolvency, fuming and other practical nonoperating considerations. As a result of these and other practical operating considerations, the degree of gelation achieved tends to be limited, making complete fusion, generally requiring temperatures of about 300° F or more, quite difficult to achieve from a practical operating viewpoint.

For all of the reasons hereinabove set forth, there is a need in the art for processing techniques useful in the production of plasticized polyvinyl chloride particles not subject to the limitations necessarily applicable to the Miller technique. In addition, plasticized polyvinyl chloride particles having a generally smaller particle size and a narrower particle size distribution than those achieved in the Miller technique are generally desired both from a handling viewpoint and with respect to desirable applications of the plasticized particles for decorative and other purposes. Furthermore, spherical beads substantially free of dust are also generally advantageous in the art. As can be seen from the discussion in Column 4, lines 20-66 of Miller, the particles produced upon entry of the stream of plastisol material into the heated water in tank 6 tend to initially assume a somewhat pear-shaped configuration that thereafter assumes a more round or spherical shape as the particle drops through the heated water bath in said tank 6. Miller indicates, in addition, that if the temperature of the water bath is quite high, the resulting acceleration of the rate of gelation of the particles will be such that particles may be gelled in a tear-drop shape, or even a filamentary shape, without having an opportunity to change to a spherical shape. While the Miller technique is thus advantageous for the production of such nonspherical shapes, it will be appreciated that a special precaution and control must be employed and observed when utilizing the Miller technique for the production of the essentially spherical, dust free particles that are highly advantageous in certain practical applications in plasticized polyvinyl chloride particles.

It is an object of the present invention, therefore, to provide an improved technique for the production of plasticized polyvinyl chloride particles.

It is another object of the invention to provide a process for the production of relatively small, essentially spherical plasticized polyvinyl chloride plastisol particles.

It is another object of the invention to provide an improved process for the production of essentially spherical plastisol particles of relatively small size having a relatively narrow particle size distribution range.

It is another object of the invention to provide an improved process for the production of a blend of two or more polyvinyl plasticized chloride particles of essentially uniform size and shape.

It is a further object of the invention to provide a simplified method for the production of plastisol particles having an advantageous combination of size, shape and handling characteristics.

With these and other objects in mind, the invention is hereinafter described in detail, the novel features thereof being particularly pointed out in the appended claims.

SUMMARY OF THE INVENTION

A polyvinyl chloride plastisol composition is dispersed into an agitated liquid medium immiscible therewith and maintained at a temperature of from about 100° F to about 140° F. The plastisol is thus dispersed into the relatively cold liquid medium as relatively small droplets of essentially spherical form having a particle size not exceeding about 0.03 inch. This dispersion of the plastisol in a liquid medium is then heated to a temperature of from about 150° F to about 350° F to achieve gelation of the small, essentially spherical droplets of plastisol material, which can then readily be separated from the liquid medium as essentially dust-free particles, having a relatively narrow particle size distribution range and advantageous, free-flowing characteristics. As a result of the dispersion of the plastisol composition into the liquid medium as small, essentially spherical droplets under initially low temperature conditions, plasticized polyvinyl chloride particles are achieved in a highly-advantageous size and shape for many practical, commercially significant plastisol applications. The process of the invention is readily adapted to the production of a blend of two or more plastisol compositions without any undesired complexity of processing conditions or equipment requirements. The invention is highly flexible with respect to the densities of the polyvinyl chloride plastisol compositions, the temperature conditions under which the preformed spherical droplets are gelled, and the like, providing advantageous processing advantages in the art. The product particles have a highly advantageous blend combination of small size, relatively narrow particle size distribution, desirable shape and highly useful handling characteristics.

DETAILED DESCRIPTION OF THE INVENTION

In the practice of the present invention, plasticized polyvinyl chloride particles are produced in a convenient and desirable manner as very small, essentially spherical particles of narrow particle size distribution and advantageous handling characteristics. The careful processing controls and undesirable operating and product limitations heretofore encountered in the art are thus overcome, while achieving a flexibility of processing conditions and product characteristics representing a highly significant advance in the art of plastisol applications.

As used herein, the term "plastisol" is intended to cover a relatively high molecular weight polyvinyl chloride resin dispersed in one or more plasticizers, the plastisol composition, upon heating or curing, forming a tough plasticized solid. For purposes of the present invention, plastisol compositions are intended to include organosols, which are similar dispersed polyvinyl chloride resin materials that, in addition, contain one or more volatile liquids that are driven off upon heating. It will be appreciated in the art that, in addition to the basic resin constituents, other commonly employed constituents may be present in the plastisol composition in minor proportions. Such other constituents commonly include heat and light stabilizers, viscosity depressants, pigments or dyes in order to contribute color to the polyvinyl chloride particles or beads being formed.

In the Miiler Patent referred to above, a typical polyvinyl chloride plastisol composition formulation, in parts by weight, is disclosed as follows:

| | |
|---|---|
| Polyvinyl chloride dispersion resin | 100 |
| 2,2,4-trimethyl-1,3-pentanediol isobutyrate benzoate | 40 |
| Epoxidized soybean oil | 6 |
| Barium, cadmium, zinc stabilizer | 5 |
| Titanium dioxide | 4 |
| High boiling mineral spirits | 6 |

The titanium dioxide in the formulation above contributes a white color to the plasticized product. Other types of pigments or a variety of dyes may be substituted for this pigment in order to provide beads of any desired color. This typical formulation is illustrative of the plastisol compositions that may be processed in accordance with the present invention, other representative plastisol compositions being hereinafter set forth.

Dispersion of the plastisol composition to produce very small, essentially spherical droplets thereof may advantageously be accomplished by adding a liquid plastisol composition, or a combination of said compositions, to a liquid medium immiscible therewith in one or more plastisol streams while the liquid medium is maintained under agitation conditions. For example, the liquid medium may be agitated by a propeller stirrer or the like, said agitation of the liquid medium continuing for as long as is required to produce the desired droplet size of plastisol material in the immiscible liquid medium. During this addition of the plastisol composition, the agitated liquid medium is maintained at a temperature below which gelation of the plastisol will generally occur. Thus, essentially no solidification or gelation will take place during this initial operation in which the plastisol is dispersed in the liquid medium.

It will be appreciated that two or more liquid plastisol compositions can be readily dispersed in the liquid medium in accordance with the present invention in the production of a desired blend of plasticized polyvinyl chloride particles. Accurate control of the ratio of the various plastisols thus dispersed, e.g., plastisols of different colors, can readily be achieved. It is within the scope of the invention to accomplish any such desired blending of plastisol composition either by the successive addition of the desired quantities of two or more such plastisols to the liquid medium, or by the simultaneous addition of said plastisols to the liquid medium. In either event, a final uniform mixture or blend will be achieved because of the continued mechanical agitation of the liquid medium during the successive or simultaneous addition of the plastisols thereto. It should also be noted that, because of the continuous agitation of the liquid medium, the plastisol compositions from which the droplets are formed can be of quite different densities, one from the other, and from the liquid medium in which they are dispersed, without undesired floating or settling of the various plastisol droplets.

As the plastisol composition is added to the liquid medium substantially immiscible therewith while said liquid medium is at a substantially cold temperature, i.e., below the gelation point of the plastisols added thereto, the processing complications that might otherwise arise as a result of premature gelation of the plastisol in the material supply systems due to heat transfer and the like are obviated in the practice of the present invention. After completion of the plastisol addition, the supply pipes, jets, nozzles, etc. can be withdrawn and, if desired and if the dispersion tank or vessel is suitably designed, the tank may be closed to permit heating of the dispersion to above the atmospheric boiling point of the heating liquid.

The liquid medium in which the plastisol, or plastisol combination, is dispersed may be any suitable liquid medium in which the polyvinyl chloride plastisol can be dispersed to produce the small, essentially spherical droplets thereof as herein provided. Water or aqueous solutions, such as an aqueous salt solution, are the generally preferred liquid media for use in the practice of the present invention, although it will be understood that other liquids can also be employed, such as certain glycols, notably diethylene glycol or glycerine. Depending upon the liquid medium employed, it may be desirable to wash the particles or beads of plasticized polyvinyl chloride plastisol material separated from the liquid medium, before drying and/or using the product particles or beads. When employing water as the liquid medium, it is within the scope of the invention and highly preferable, if not actually essential, to incorporate in the water a suitable water soluble dispersing agent to facilitate the dispersion of the polyvinyl chloride plastisol in the aqueous medium. The dispersing agent serves not only to assist in the formation of the desired dispersion, but in the maintaining of said dispersion of the desired droplets in the agitated liquid medium until the droplets, of desired size, are gelled as herein provided. While any suitable dispersing agent may be employed for this purpose, a water soluble cellulose ether, such as methyl cellulose or ethyl cellulose, is generally satisfactory and suitable. Methyl cellulose, for example, may be employed in a concentration of from about 0.05% to about 5% by weight based on the total weight of the aqueous liquid medium, with concentrations of from about 0.1% to about 1% by weight being generally preferred, with concentrations at the lower level of the ranges so indicated being generally satisfactory. Other suitable dispersing agents, e.g. a fatty alcohol sulphate, the sodium salt of aryl alkyl polyether sulphonate, highly polymerized glycol esters, purified sulpholignin, and the like may be employed, alone or with said water soluble cellulose ether, providing that the conventional dispersing agent employed serves to facilitate the desired dispersion of the particular plastisol composition employed in the aqueous or other liquid medium employed in which the plastisol composition is being dispersed.

In order to prevent gelation of the plastisol during the initial dispersion operation discussed above, the liquid medium is employed as a relatively cold liquid during the initial plastisol addition and dispersion step of the present invention. For this purpose, the liquid medium is maintained at a temperature generally within the range of from about 100° F to about 140° F during the plastisol addition and dispersion step. While somewhat higher liquid temperatures may be employed, it will be appreciated that gelation of the polyvinyl chloride plastisol will generally occur at temperatures of about 150° F and above so that temperatures of this magnitude will generally be disadvantageous in that premature gelation of the plastisol may occur prior to the achieving of the desired particle size thereof in the agitated liquid medium. With respect to plastisols having a higher gelation temperature, on the other hand, it will be understood that somewhat higher temperatures can thus be employed within the scope of the present invention without adverse effect on the desired formation of small, essentially spherical droplets of relatively uniform, narrow particle size distribution. At the lower end of the temperature range for the liquid medium during the dispersion of plastisol therein, it has generally been found desirable to warm the liquid medium, as to the 100° F temperature indicated above. In particular embodiments, it may be generally desirable to warm the liquid medium to a somewhat higher temperature, i.e., on the order of above 115° F to about 125° F while avoiding the upper range indicated above, i.e., about 140° F, particularly where processing controls may not be adequate to fully assure against the higher liquid medium temperatures such as to result in premature gelation of the plastisol droplets. Within the scope of the present invention, such temperatures are deemed to be "essentially cold," as opposed to the elevated temperatures thereinafter employed in the second step of the process in which gelation of the dispersed droplets is desired. It should also be noted that temperatures below 100° F may also be employed, although the desired dispersion of the plastisol in the liquid medium is generally facilitated by a warming of the liquid medium as hereinabove indicated.

Upon completion of the desired dispersion of the plastisol in the liquid medium to produce relatively small droplets of essentially spherical form, the resulting dispersion of the droplets in the liquid medium is heated to a temperature within the range of from about 150° F to about 350° F or above, to achieve the desired gelation of the plastisol droplets at a desired particle size generally not exceeding about 0.03 inch. As indicated above, provisions can be made to achieve higher temperatures than the atmospheric boiling point of the liquid medium if desired, as for the complete fusion of the plastisol droplets at temperatures of 300° F or more. When water, together with a dispersing agent, is employed as a liquid medium, temperatures of about 350° F, i.e., in the fusing range of most plastisols, can be achieved at about 120 psi (gauge) steam pressure. In many instances, however, such complete fusion is not required, and the liquid medium may be heated under less stringent requirements, as from about 150° F to the boiling point of said liquid medium, e.g. about 212° F for aqueous liquid medium. Heating the liquid medium to from about 170° F to about 190° F is generally satisfactory and sufficient for many practical applications of the invention.

After heating the liquid medium containing the dispersed plastisol droplets to a sufficient temperature to gel the droplets, with fusion or partial fusion of the droplets if desired, and with the decomposition of the blowing agent therein if desired, the dispersion can be cooled and discharged from the heating vessel for subsequent washing, drying and the like. Alternatively, the dispersion can be discharged at elevated temperatures and pressures, as advantageously in some instances to assist in the rapid drying of the plastisol particles or beads or the blowing thereof in the case of foamable plastisol compositions. While the overall method thus employed in the practice of the present invention is adapted for batch process operations, continuous processing may be effected as by injection of the plastisol into a closed system of pipes or vessels wherein the aqueous phase or other liquid medium is initially maintained at a temperature below the gelation point of the plastisol droplets, followed by a continuous passage of the resulting suspension into heat exchangers to raise the temperature of the dispersion to the plastisol gelation point. The continuous stream of liquid medium containing the thus gelled plastisol droplets can then be passed through suitable cooling and discharge zones, followed by the removal of the gelled particles from the liquid medium, drying of the separated plastisol particles, and recirculation of the aqueous liquid medium for the dispersion of additional quantities of plastisol therein. It will be understood by those skilled in the art that any convenient method may be employed for separating the plasticized polyvinyl chloride particles from the liquid medium, as by decantation, filtration or other convenient and conventional solid-liquid separation techniques.

As hereinabove indicated, the gradual addition of a plastisol composition or compositions to the essentially cold liquid medium results in the dispersion of the plastisol therein as small, essential uniform droplets that are thereinafter gelled to provide plasticized particles having the desired size and shape. It will be appreciated that a number of processing variables can assist or effect the precise size and shape, and properties of the plasticized particles obtained. For example, the nature of the liquid medium employed, together with the variety of other factors, will influence the desired product. Water is indicated as a preferred liquid medium for a number of reasons, such as its boiling point characteristics, its miscibility with plastisol, safety in handling and the like, and general economic considerations. The viscosity of the liquid medium, of course, will also have a bearing on the size, shape and characteristics of the plasticized particles. With respect to an aqueous liquid medium, the viscosity can readily be controlled and in a given instance by the nature and amount of soluble polymer incorporated therewith, for example, the dispersing agent referred to above. The viscosity of the plastisol composition itself will also be a factor in determining the size, shape and properties of any given plasticized polyvinyl product. Other particular variables that assist in controlling droplets and final product size, shape and properties are the temperature of the liquid medium at the time of plastisol addition and dispersion, as effecting another control of the viscosity of the liquid medium and the plastisol composition, the gelling or curing temperature to which the liquid medium is heated, thus controlling the degree of gelation or fusion, or the blowing of foamable material, the nature of various additives in the liquid medium, such as emulsifiers, thickeners, protective colloids, and the like, and the type and degree of agitation employed during the plastisol addition and dispersion step and during the subsequent heating operation to achieve gelation thereof.

As indicated above, the Miller technique can be employed successfully to produce relatively large plastisol beads having a relatively wide particle size distribution range. The present invention is particularly advantageous in the preparation of relatively small, essentially spherical plasticized particles having an advantageously narrow particle size distribution. In general, therefore, the plastisol composition or blend thereof will be gradually added to the liquid medium, which is maintained in an agitated state, so as to disperse the plastisol as relatively small droplets of essentially spherical form having a particle size not exceeding about 0.03 inch. While the precise particle size of the droplets, and of the gelled particles produced therefrom, is not critical, the production of droplets and gelled particles having the particle size distribution of generally from about 0.01 inch to about 0.025 inch is particularly advantageous and desirable to many plastisol applications. For the reasons indicated above, the desired particle size may be achieved by a simple manipulation of a variety of operating factors in any given application of the present invention. A particle size distribution of generally from about 0.01 inch to about 0.02 inch may be desirable for some plastisol application purposes. It should be understood, however, that the particle size distribution herein set forth does not represent a critical distribution range, but the general particle size distribution obtainable in the practice of the invention, it being understood that relatively small amounts of particles are produced that may fall outside any given particle size distribution, either at the lower or at the upper end thereof, without departing from the scope of the present invention. Operation in accordance with the process of the present invention will, in any event, readily result in the production of essentially spherical plasticized particles of a relatively small size, having a relatively narrow particle size distribution, as compared with the relatively large sized particles of considerably wider particle sized distribution and of less regular shape as obtained for advantageous use, where desired, as by the Miller technique. The relatively small, essentially spherical particles of narrow particle size distribution produced in accordance with the present invention, it should be noted, are also essentially dust free and have highly desirable "free flowing" characteristics resulting from their high degree of uniformity of size and shape.

The present invention is hereinafter further described with respect to specific illustrative examples thereof. The examples are presented merely to further illustrate the practice of the present invention, and should not be construed as limiting in any manner the scope of the invention as herein disclosed, the novel features thereof being recited in the appended claims. Unless specifically indicated to the contrary, all parts and proportions referred to herein and in the appended claims are to be construed as by weight.

Three representative plastisol compositions were prepared using the following formulations, the ingredients thereof being in parts by weight:

| Plastisol Formulation Ingredients | Polyvinyl Chloride (PVC) Plastisol Compositions (Grams) | |
|---|---|---|
| | A,B | C |
| Dispersion grade PVC resin (Tenneco 1742) | 85 | — |
| Dispersion grade PVC resin (Diamond 74) | 15 | — |
| Dispersion grade PVC resin (Firestone 605) | — | 55 |
| Extender grade PVC resin (Pliovic M50) | — | 45 |
| Pentanediol isobutyrate benzoate | 42 | 58.4 |
| Mineral thinner | 4.0 | 2.5 |
| Surfactant(Igepal CO-430) | 0.6 | — |
| Epoxidized tall oil | 6.0 | — |
| Epoxidized soya oil (Abmex 710) | — | 6.3 |
| Calcium-zinc stabilizer | 5.0 | — |
| Zinc-cadmium stabilizer-catalyst | — | 2.5 |
| Titanium dioxide | — | 15.0 |
| Azobisformamide | — | 2.5 |

In preparing plastisol compositions A and B, all liquid ingredients were mixed, and the PVC resins were stirred in gradually, as wetted, followed by an additional 20 minutes of stirring by means of a propeller mixer after the last resin addition had been made. In the preparation of plastisol composition C, all liquid ingredients were mixed except for epoxidized soya oil and a portion of the pentanediol isobutyrate benzoate. Titanium dioxide, azobisformamide, epoxidized soya oil, and the remaining portion of pentanediol isobutyrate benzoate were mixed and ground on a three roll mill and thereafter added to the liquid ingredients. PVC resins were then stirred into the mix, as wetted, and thereafter stirred with said propeller mixer for 20 minutes.

In the production of plasticized polyvinyl chloride particles, in accordance with the present invention, the plastisols indicated above were each dispersed in separate bodies of liquid media comprising 900 grams of water and 1 gram of a water soluble methyl cellulose, namely Methocel 65 HG, prepared by dissolving the Methocel in a portion of the water, and then adding thereto the balance of the water. In the preparation of beads or plasticized particles from Plastisol A, 50 grams of the above Plastisol A were tinted with a trace of yellow pigment dispersion, and the other 50 grams thereof were tinted with a trace of blue pigment dispersion. The indicated aqueous liquid medium was warmed to about 100° F and was agitated with a stirrer having two 1¾ inch three-blade propellers on a shaft rotating at 860 RPM, off centered to the liquid medium container. The two tinted plastisols were poured into the aqueous liquid medium gradually, in successive fashion, over a 3-minute addition period during which the aqueous liquid medium was being warmed to about 120° F. After the addition of the plastisol materials was completed, the temperature of the resulting dispersion was raised to about 190° F over the course of about sixteen minutes, thereby solidifying the plastisol droplets as essentially spherical beads. The water was decanted off, and the solidified blend of blue and yellow colored beads was removed from the container and dried on absorbent paper.

Plastisol beads were prepared using Plastisol Composition B, following the same procedure as indicated above with respect to Plastisol Composition A, except that the temperature of the aqueous liquid medium was somewhat higher at the time of plastisol addition, namely from about 125° F to about 140° F. The stirring means were centered in the container in this embodiment. In heating the dispersion of plastisol droplets in the aqueous liquid medium to achieve gelation of the droplets, the temperature thereof was raised to about 190° F over a period of about 12 minutes. Similarly, plastisol beads were prepared from Plastisol Composition C using the procedure set forth above with respect to the preparation of beads from Plastisol A. The procedures thus employed in the preparation of beads from Plastisols A, B, and C are summarized in the table below.

TABLE

| | PLASTISOL COMPOSITION | | |
|---|---|---|---|
| | A | B | C |
| Aqueous phase, grams | 901 | 901 | 901 |
| Plastisol phase, grams | 100 | 100 | 100 |
| Number of plastisol colors | 2 | 2 | 2 |
| Plastisol viscosity, cps | 1,000 | 1,000 | 2,300 |
| Water temperature during addition and dispersion, °F | 100–120 | 125–145 | 100–115 |
| Final water temperature, °F | 190 | 190 | 190 |
| Time of plastisol addition, min. | 3 | 3 | 3 |
| Total time to heat dispersion to 190°F, min. | 16 | 12 | 17 |
| RPM of stirrer | 860 | 850 | 860 |

In each instance, the gradual addition of the plastisol to the aqueous liquid medium maintained in an agitated state resulted in the dispersion of the polyvinyl chloride plastisol as relatively small liquid droplets of essentially spherical form having a relatively narrow particle size distribution. Upon heating the resulting dispersion to a temperature in excess of the gelation temperature of the plastisols, the plastisol droplets having the desired size, shape and limited particle size distribution were gelled to produce plasticized particles or beads that were readily separated from the liquid medium. In each instance, the beads thus recovered were of a relatively small size, i.e., not exceeding 1/32 inch, with a narrow particle size distribution. Thus, said plastisol beads can be obtained with about 60% passing through 35 mesh U.S. screen and 40% of the beads retained thereon. By minor manipulation of the various processing factors, the size of the plastisol beads obtained can be varied, as, for example, to achieve about 85–95% retention on a 35 mesh screen. Smaller or larger sized droplets can also be produced in this manner, as for example if particles on the order of about 20 mesh or of about 28 mesh, i.e., about 0.023 inch, were desired. In any event, the process of the present invention will generally be employed in the production of relatively small plastisol beads having a particle size of generally about 0.030 or smaller. It should also be noted that, at whatever particular particle size the essentially spherical beads are produced, the particle size distribution thereof is relatively narrow and considerably less, for example, than the disclosed and obtainable by the Miller technique. It should also be noted that the beads produced in the examples indicated above were separated and recovered as a uniform blend of the blue and yellow tinted materials, the blend thereof being produced despite the successive additions of blue and yellow plastisol since the solidified droplets were maintained in dispersed form by continuous agitation, without either floating or settling from the liquid medium during the solidification operation.

The plasticized particles or beads produced in accordance with the present invention, being finely divided, essentially spherical and of relatively narrow particle size distribution, have many potential useful and important applications in the art. Because of their advantageous size and shape, the beads produced in accordance with the invention are found to be relatively dust free and to have very desirable "free flowing" characteristics. Thus, the beads produced in accordance with the present invention have enhanced and highly advantageous handling characteristics that, from a practical viewpoint, serve to render the beads of considerable interest. In various applications of the particles, the specific shape and size of the particles may be of prime importance, with the specific composition being of incidental significance, while in other applications, the specific plastisol composition from which the beads are prepared will likewise play an important factor in a specific utility of enhanced value and interest in the art. With respect to the general enhanced handling characteristics of the particles of the invention, the uniform size, freedom from fines or dust, and the advantageous sphericity of particles make them especially suitable and convenient as compared to chopped, ground, or otherwise comminuted material in which the size, shape and particle distribution cannot be so readily and conveniently controlled. In addition, the ability to produce carefully controlled color blends, or other desired mixtures, obviates the necessity for storage, weighing and blending of particles produced from single colored stock to achieve a desired color blend. It is also pointed out that particles or beads produced in accordance with the invention from plastisols containing blowing agents possess a unique characteristic in that, after the blowing action, the individual beads are found to be "closed cell" due to the skin formation around them, so that the identity of the bead is retained, with little, if any, joining of individual gas cells.

Among the applications for the plasticized particles of the present invention are to achieve decorative effects for surface coverings, use in the production of cast or molded products, xerography applications, and in applications involving optical effects, reflective tapes, projection screens, contrasts between reflective and non-reflective areas, and other applications inherently utilizing the sphericity of the particles For decorative effects in surface covering applications, the plasticized particles have utility, for example, for simulated sand in brick, stone and tile mortars, and for positioned deposits analogous to patterned flock effects in surface coverings. Particles can also be employed in multicolored "salt and pepper" effects with and without overcoating, as in electrostatic deposition techniques known in the art. The particles may also be employed in liquid coatings and in pressed compositions, such as tiles. In cast or molded products, the particles of the invention may be used as a decorative element in liquid castings, in sintered products and in cork-like products.

In applications such as the electrostatic deposits of particles in controlled areas, as practiced in xerography, the particular particle as produced in accordance with the present invention may be of particular advantage even though the specific shape and size of the particle is lost in the final product produced therefrom. Thus, the enhanced "free flow" of the particles resulting from their sphericity, freedom from dust and relatively narrow particle size range may be of particular interest in the application of the particles to such fields of specific application. The particles of the invention are likewise of interest with respect to fluidized bed coating application processes known in the art.

The present invention, therefore, provides a novel and highly advantageous method for producing plasticized polyvinyl chloride particles or beads. The particles produced by this novel method have outstanding characteristics of size and shape, rendering the particles of special interest from a handling viewpoint and in a wide variety of applications, particularly where decorative effects are desired as in sheet vinyl surfacing products. The ability of the present invention, in a simple and expeditious manner, to produce a desirable blend of plastisol beads is of further major interest in the art, eliminating the handling, storage, and processing requirements, and associated increases in incremental cost, otherwise required to produce such desirable blends of plastisol beads.

Therefore, I claim:

1. A method for the production of essentially spherical, plasticized polyvinyl chloride particles having an advantageously narrow particle size distribution comprising:
   a. gradually adding a liquid polyvinyl chloride plastisol composition to an agitated liquid medium substantially immiscible therewith and maintained at a temperature of from about 100° F to about 140° F, said plastisol being thereby dispersed as relatively small droplets of essentially spherical form having a particle size not exceeding about 0.03 inch;
   b. heating said dispersion in liquid medium to a temperature within the range of from about 150° F to about 350° F with continued agitation to achieve gelation of said droplets at a desired size not exceeding about 0.03 inch, and
   c. separating the resulting plasticized polyvinyl chloride particles from said liquid medium, whereby the plasticized particles are obtained as small essentially spherical particles of relatively narrow particle size distribution with advantageous, essentially dust free and free flowing characteristics.

2. The method of claim 1 in which said liquid medium is heated to from about 150° F to the boiling point of said liquid medium.

3. The method of claim 2 in which said liquid medium is heated to from about 170° F to about 190° F.

4. The method of claim 1 in which said immiscible liquid medium in which the plastisol is dispersed comprises an aqueous liquid medium.

5. The method of claim 4 in which said aqueous liquid medium contains a water soluble dispersing agent to facilitate said dispersion of the polyvinyl chloride plastisol in said aqueous liquid medium.

6. The method of claim 5 in which said dispersing agent comprises a water soluble cellulose ether.

7. The method of claim 6 in which said cellulose ether comprises methyl cellulose.

8. The method of claim 7 in which said liquid is heated to from about 150° F to the boiling point thereof.

9. The method of claim 8 in which said liquid medium is heated to from about 170° F to about 190° F.

10. The method of claim 7 in which said methyl cellulose is employed in a concentration of from about 0.05% to about 5% by weight based on the total weight of said liquid medium.

11. The method of claim 10 in which said methyl cellulose concentration is from about 0.1% to about 1% by weight based on the total weight of said liquid medium.

12. The method of claim 1 in which said plasticized particles of essentially spherical form have a particle size distribution of generally from about 0.01 inch to about 0.025 inch.

13. The method of claim 12 in which said particle size distribution is generally from about 0.01 inch to about 0.02 inch.

14. The method of claim 5 in which said plasticized particles have a particle size distribution of generally from about 0.01 inch to about 0.025 inch.

15. The method of claim 14 in which said particle size distribution is generally from about 0.01 inch to about 0.02 inch.

16. The method of claim 14 in which said dispersing agent comprises a water soluble cellulose ether.

17. The method of claim 16 in which said cellulose ether comprises methyl cellulose.

18. The method of claim 17 in which said liquid medium is heated to from about 150° F to the boiling point of said liquid medium.

19. The method of claim 18 in which said liquid medium is heated to from about 170° F to about 190° F.

20. The method of claim 1 and including the dispersing of one or more additional liquid polyvinyl chloride plastisols in said liquid medium, said additional plastisols being gelled upon heating said liquid medium, the plasticized particles being separated from the liquid medium as a blend of said plastisols.

21. The method of claim 20 in which said plastisols are dispersed simultaneously in said liquid medium.

22. The method of claim 20 in which said plastisols are dispersed successively in said liquid medium.

23. The method of claim 20 in which said plastisols are of varying colors.

24. The method of claim 5 and including the dispersing of one or more additional liquid polyvinyl chloride plastisols in said liquid medium, said additional plastisols being gelled upon heating said liquid medium, the plasticized particles being separated from the liquid medium as a blend of said plastisols.

25. The method of claim 24 in which said dispersing agent comprises a water soluble cellulose ether.

26. The method of claim 25 in which liquid medium is heated to from about 150° F to the boiling point thereof.

27. The method of claim 26 in which said dispersing agent comprises methyl cellulose in a concentration of from about 0.05% to about 5% by weight of said liquid medium, the plasticized particles having a particle size distribution of generally from about 0.01 inch to about 0.025 inch.

28. The method of claim 27 in which said particle size distribution is generally from about 0.01 inch to about 0.02 inch.

* * * * *